US008706977B2

(12) United States Patent
Lee et al.

(10) Patent No.: US 8,706,977 B2
(45) Date of Patent: Apr. 22, 2014

(54) METHOD AND APPARATUS FOR INTER-PROCESSOR COMMUNICATION IN MOBILE TERMINAL

(75) Inventors: Ki Yong Lee, Suwon-si (KR); Jae Kyong Choi, Suwon-si (KR)

(73) Assignee: Samsung Electronic Co., Ltd., Suwon-si (KR)

( * ) Notice: Subject to any disclaimer, the term of this patent is extended or adjusted under 35 U.S.C. 154(b) by 633 days.

(21) Appl. No.: 12/967,356

(22) Filed: Dec. 14, 2010

(65) Prior Publication Data
US 2011/0145514 A1    Jun. 16, 2011

(30) Foreign Application Priority Data
Dec. 16, 2009   (KR) .......................... 10-2009-0125462

(51) Int. Cl.
*G06F 12/02*  (2006.01)
(52) U.S. Cl.
USPC .......................................... 711/153; 711/171
(58) Field of Classification Search
USPC ................................................ 711/153, 171
See application file for complete search history.

(56) References Cited

U.S. PATENT DOCUMENTS

| 5,623,608 A * | 4/1997 | Ng ................................ 711/137 |
| 5,974,518 A * | 10/1999 | Nogradi ........................ 711/173 |
| 2007/0076735 A1* | 4/2007 | Soo ................................ 370/412 |
| 2009/0313440 A1* | 12/2009 | Kim et al. ...................... 711/149 |
| 2010/0318755 A1* | 12/2010 | Berkmann et al. ............. 711/157 |
| 2010/0332909 A1* | 12/2010 | Larson ............................ 714/40 |

* cited by examiner

*Primary Examiner* — Jared Rutz
(74) *Attorney, Agent, or Firm* — Jefferson IP Law, LLP

(57) ABSTRACT

A method for inter-processor communication in a mobile terminal is disclosed. The method of inter-processor communication for a mobile terminal having a first processor, a second processor, and a shared memory includes determining, by the first processor, the size of data to be sent to the second processor, comparing the determined size of the data with the size of one of multiple buffer areas in the shared memory to be used for transmission, rearranging the shared memory according to the data size when the size of the data is greater than the size of the buffer area to be used, and sending the data to the second processor through the rearranged shared memory. It is possible to increase data transfer rates between processors when inter-processor communication is performed through a shared memory in a mobile terminal having multiple processors.

14 Claims, 8 Drawing Sheets

METHOD AND APPARATUS FOR INTER-PROCESSOR COMMUNICATION IN MOBILE TERMINAL

PRIORITY

This application claims the benefit under 35 U.S.C. §119 (a) of a Korean patent application filed on Dec. 16, 2009 in the Korean Intellectual Property Office and assigned Serial No. 10-2009-0125462, the entire disclosure of which is hereby incorporated by reference.

BACKGROUND OF THE INVENTION

1. Field of the Invention

The present invention relates to inter-processor communication in a mobile terminal. More particularly, the present invention relates to a method and an apparatus for inter-processor communication using a shared memory in a mobile terminal having at least two processors.

2. Description of the Related Art

A standard mobile terminal is equipped with a single processor, which handles all operations necessary for the terminal. However, due to rapidly increasing demand for multimedia features, it is becoming more difficult for single-processor mobile terminals to process the increasingly complex and numerous multimedia related functions. Hence, high end mobile terminals having two processors have been developed.

In a mobile terminal having two processors, the two processors must exchange data. In an existing mobile terminal, inter-processor communication is performed using a Static Random Access Memory (SRAM). However, bus arbitration logic necessary for bus sharing between processors tends to degrade inter-processor communication performance. To address this problem, inter-processor communication based on the shared memory is employed.

In a mobile terminal, buffer areas for individual processors are provided in the shared memory, and one processor transmits data to another processor using an assigned buffer area. On the assumption that the amount of data exchanged between the processors is equal, buffer areas of equal size are assigned to the processors.

During use of the mobile terminal, the amount of data sent by the first processor to the second processor may exceed the amount of data sent by the second processor to the first processor. When the amount of data to be sent by one processor exceeds the size of the assigned buffer area, the processor has to perform multiple data transmission operations with data segmentation. This may reduce data transfer rates.

Therefore, a need exists for a method and an apparatus for a mobile terminal having multiple processors that enhance data transfer rates between processors.

SUMMARY OF THE INVENTION

An aspect of the present invention is to address at least the above-mentioned problems and/or disadvantages and to provide at least the advantages described below. Accordingly, an aspect of the present invention is to provide an inter-processor communication method and an apparatus for a mobile terminal having multiple processors that enhance data transfer rates between processors.

In accordance with an aspect of the present invention, a method of inter-processor communication for a mobile terminal having a first processor, a second processor and a shared memory is provided. The method includes: determining, by the first processor, the size of data to be sent to the second processor, comparing the determined size of the data with the size of one of multiple buffer areas in the shared memory to be used for transmission, rearranging the shared memory according to the data size when the size of the data is greater than the size of the buffer area to be used, and sending the data to the second processor through the rearranged shared memory.

In accordance with another aspect of the present invention, a mobile terminal is provided. The terminal includes: a shared memory including multiple buffer areas, a first processor for determining the size of data to be sent, for comparing the size of the data with the size of one of the buffer areas to be used for transmission, for rearranging the shared memory according to the data size when the size of the data is greater than the size of the buffer area to be used, and for sending the data through the rearranged shared memory; and a second processor for receiving data from the first processor through the shared memory.

In a feature of the present invention, it is possible to increase data transfer rates between processors when inter-processor communication is performed through a shared memory in a mobile terminal having multiple processors.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
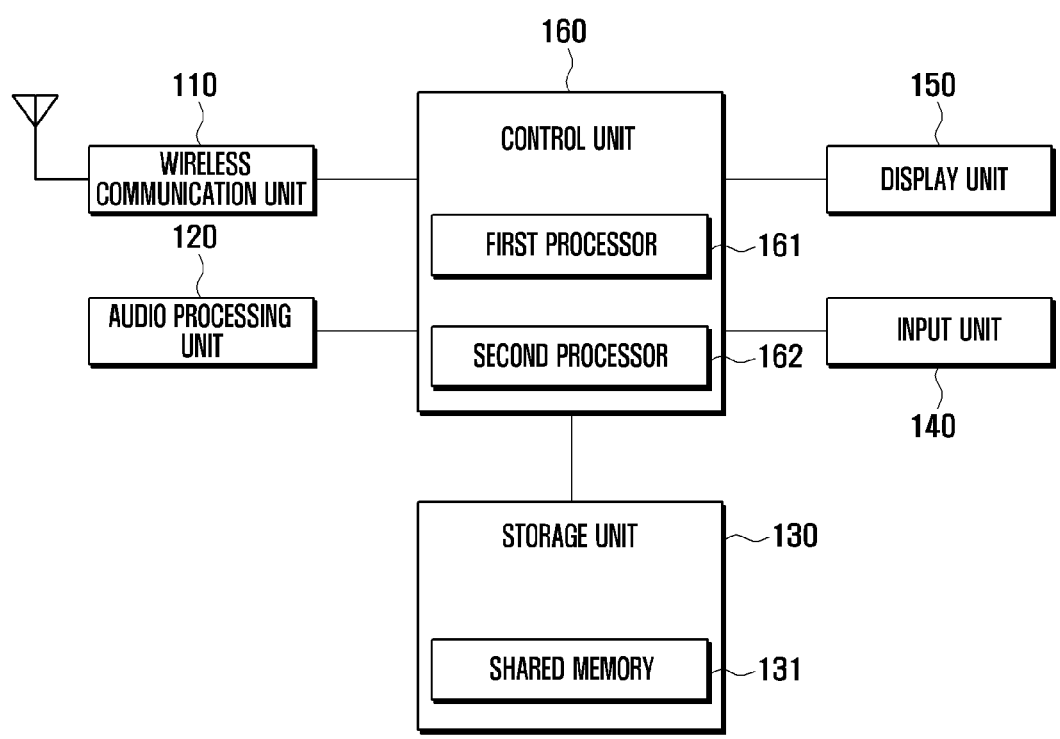
FIG. 1 is a block diagram of a mobile terminal having multiple processors according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and the claims are not limited to the bibliographical meanings, but, are merely used by the inventor to enable a clear and consistent understanding of the invention. Accordingly, it should be apparent to those skilled in the art that the description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The mobile terminal of the present invention may be a mobile communication terminal, a digital broadcast receiver, a Personal Digital Assistant (PDA), or a smart phone. Here, the mobile communication terminal may include an International Mobile Telecommunications 2000 (IMT 2000) terminal, a Wideband Code Division Multiple Access (WCDMA) terminal, a Global System for Mobile communications (GSM)/General Packet Radio Services (GPRS) terminal, or a Universal Mobile Telecommunications System (UMTS) terminal.

FIGS. 1-5D, discussed herein, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

FIG. 1 is a block diagram of a mobile terminal having multiple processors according to an exemplary embodiment of the present invention.

Referring to FIG. 1, the mobile terminal includes a wireless communication unit 110, an audio processing unit 120, a storage unit 130, an input unit 140, a display unit 150, and a control unit 160. The wireless communication unit 110 sends and receives data for wireless communication of the mobile terminal. The wireless communication unit 110 may include a radio frequency transmitter for upconverting the frequency of a signal to be transmitted and for amplifying the signal, and a radio frequency receiver for low-noise amplifying a received signal and for downconverting the frequency of the signal. The wireless communication unit 110 may receive data through a wireless channel and forward the received data to the control unit 160, and may transmit data from the control unit 160 through the wireless channel.

The audio processing unit 120 may include a coder/decoder (codec). The codec includes a data codec for processing packet data, and an audio codec for processing an audio signal such as a voice signal. The audio processing unit 120 converts a digital audio signal into an analog audio signal through the audio codec to reproduce the analog audio signal through a speaker, and also converts an analog audio signal from a microphone into a digital audio signal through the audio codec.

The storage unit 130 stores programs and data necessary for the operation of the mobile terminal, and may include a program section and a data section. The storage unit 130 may include a volatile storage media, a non-volatile storage media, or a combination thereof. More particularly, the storage unit 130 includes a shared memory 131. The shared memory 131 may include a dual-ported Random Access Memory (RAM) or One Dynamic RAM (OneDRAM). The shared memory 131 includes multiple buffer areas and multiple interrupt areas. The configuration of the shared memory 131 is described later in connection with FIG. 2.

The input unit 140 generates a key signal corresponding to user manipulation and sends the key signal to the control unit 160. The input unit 140 may include a keypad including alphanumeric keys and direction keys arranged in a 3*4 format, a QWERTY format, or a touch pad. The input unit 140 generates a key signal corresponding to a user request for a function (related to call processing, moving image capture, music playback, image display, broadcast reception, or application execution) and sends the key signal to the control unit 160.

The display unit 150 may be realized using a Liquid Crystal Display (LCD) device. The display unit 150 visually provides various information such as menus, input data, and function-setting data to the user. For example, the display unit 150 may output a boot screen, an idle screen, a call handling screen, and other application screens for the mobile terminal.

The control unit 160 controls the overall operation of the mobile terminal and controls signal exchange between internal components thereof. More particularly, the control unit 160 includes multiple processors. In the following description, the control unit 160 is assumed to include two processors (a first processor 161 and a second processor 162). However, exemplary embodiments of the present invention are not limited thereto, and may be applied to a mobile terminal having three or more processors. In an exemplary implementation, the first processor 161 may be a GSM modem and the second processor 162 may be a CDMA modem, and vice versa. In an exemplary implementation, the first processor 161 may be a central processor controlling overall terminal operation and the second processor 162 may be an application processor controlling applications, and vice versa. The first processor 161 is described in connection with FIGS. 2 to 5D, and the second processor 162 is described in connection with FIG. 2 and FIGS. 5A to 5D.

Figure 2:
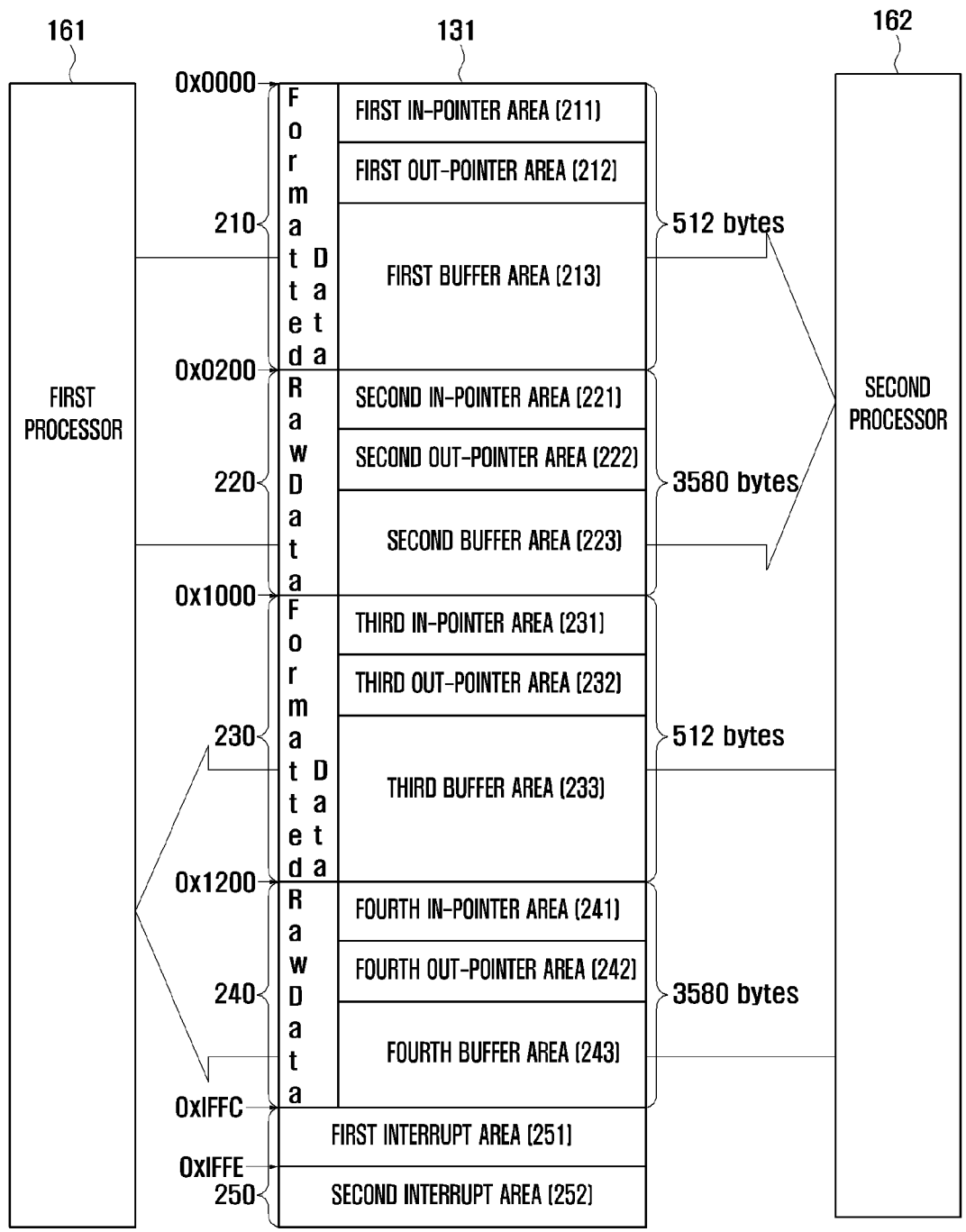
FIG. 2 illustrates the layout of a shared memory together with a first processor and a second processor according to an exemplary embodiment of the present invention.

FIG. 2 illustrates the layout of a shared memory together with a first processor and a second processor according to an exemplary embodiment of the present invention.

Referring to FIG. 2, the shared memory 131 includes a first area 210 and a second area 220 for storing data to be sent from the first processor 161 to the second processor 162, a third area 230 and a fourth area 240 for storing data to be sent from the second processor 162 to the first processor 161, and an interrupt area 250 for storing interrupt values. The first processor 161 utilizes the first area 210 and the second area 220 for data transmission, and the third area 230 and the fourth area 240 for data reception. The second processor 162 utilizes the first area 210 and the second area 220 for data reception, and the third area 230 and the fourth area 240 for data transmission.

Here, the first area 210 and the third area 230 are used to store "formatted data", and the second area 220 and the fourth area 240 are used to store "raw data".

In the above described method, formatted data has a preset data type in the mobile terminal, and the header of formatted data carries a data type indication. For example, call data and short messaging service (SMS) data may be classified as formatted data, and may carry data type information such as an "incoming call", an "outgoing call" or an "SMS" in the header.

Raw data does not have a preset data type in the mobile terminal. That is, the header of raw data does not carry data type information.

The first area 210 includes a first in-pointer area 211, a first out-pointer area 212, and a first buffer area 213. The second area 220 includes a second in-pointer area 221, a second out-pointer area 222, and a second buffer area 223. The third area 230 includes a third in-pointer area 231, a third out-pointer area 232, and a third buffer area 233. The fourth area 240 includes a fourth in-pointer area 241, a fourth out-pointer area 242, and a fourth buffer area 243. The interrupt area 250 includes a first interrupt area 251 in which the first processor 161 writes an interrupt value, and a second interrupt area 252 in which the second processor 162 writes an interrupt value. In summary, the shared memory 131 includes 4 in-pointer areas, 4 out-pointer areas, 4 buffer areas, and 2 interrupt areas.

The in-pointer area stores an address value of data stored in the buffer area. For example, when the first processor 161 wishes to send formatted data to the second processor 162, it writes the data in the first buffer area 213 and writes the address value of the written data in the first in-pointer area 211.

The out-pointer area stores the number of processed data items (quantity of processed data). For example, when the second processor 162 reads stored data from the first buffer area 213, it writes the quantity of read data in the first out-pointer area 212.

The buffer area stores data exchanged between processors. The interrupt area stores an interrupt value. The first processor 161 writes an interrupt value in the first interrupt area 251, and the second processor 162 writes an interrupt value in the second interrupt area 252. When the first processor 161 writes an interrupt value in the first interrupt area 251, the second processor 162 is interrupted and identifies the interrupt value in the first interrupt area 251. When the second processor 162 writes an interrupt value in the second interrupt area 252, the first processor 161 is interrupted and identifies the interrupt value in the second interrupt area 252.

In the shared memory 131, the first to fourth areas 210 to 240 may be of a fixed-size. The sizes of the first to fourth areas 210 to 240 may be set to different sizes according to the type of the shared memory. For example, the first to fourth areas 210 to 240 may have the same size or different sizes. The first area 210 and the third area 230 may have the same size, and the second area 220 and the fourth area 240 may have the same size. In an exemplary embodiment of the present invention, the sizes of the first to fourth areas 210 to 240 are variable. For the purpose of description, it is assumed that the first area 210 and the third area 230 are set to 512 bytes and the second area 220 and the fourth area 240 are set to 3580 bytes. In the shared memory 131 of FIG. 2, the first area 210 is a region of addresses from 0x0000 to 0x0200, the second area 220 is a region of addresses from 0x0200 to 0x1000, the third area 230 is a region of addresses from 0x1000 to 0x1200, the fourth area 240 is a region of addresses from 0x1200 to 0x1FFC, and the first interrupt area 251 is a region of addresses from 0x1FFC to 0x1FFE.

The first processor 161 sends formatted data through the first area 210 to the second processor 162, and sends raw data through the second area 220 thereto. The second processor 162 sends formatted data through the third area 230 to the first processor 161, and sends raw data through the fourth area 240 thereto.

The shared memory 131 is described as having four data storage areas. However, exemplary embodiments of the present invention are not limited thereto or thereby, and the shared memory 131 may have four or more data storage areas depending upon the data types.

Hereinabove, a description is given of the configuration of the mobile terminal and the layout of the shared memory. Next, a description is given of a method for inter-processor communication based on a shared memory in the mobile terminal. The following description is focused on a case in which the first processor 161 sends data to the second processor 162. However, the description is also applicable to a case in which the second processor 162 sends data to the first processor 161.

Figure 3:
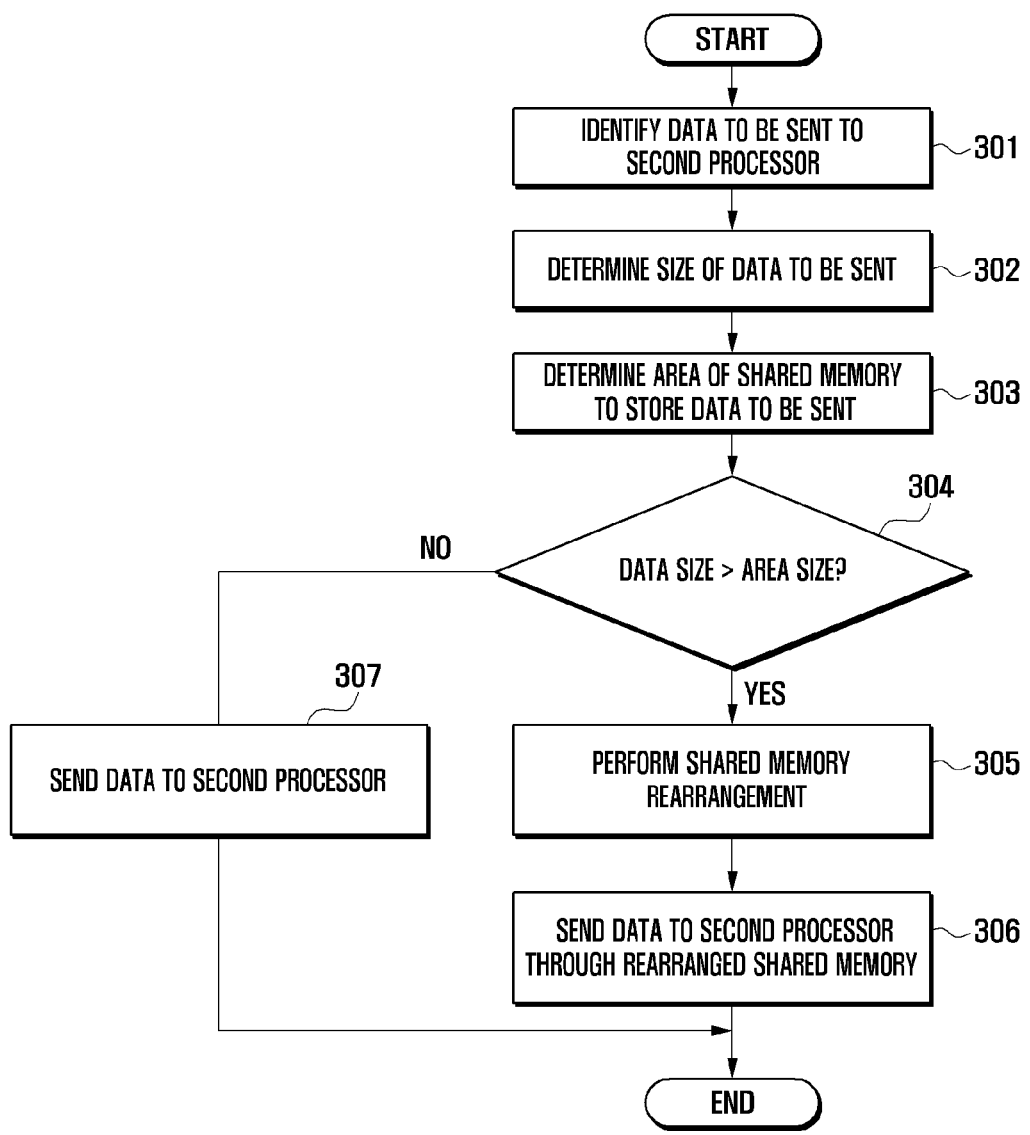
FIG. 3 is a flowchart of a procedure for data transmission between a first processor and a second processor using a shared memory according to an exemplary embodiment of the present invention.

FIG. 3 is a flowchart of a procedure for data transmission between a first processor and a second processor using a shared memory according to an exemplary embodiment of the present invention.

Referring to FIG. 3, the first processor 161 sends data to the second processor 162. As described in connection with FIG. 3, it is assumed that the first area 210 and the third area 230 are set to 512 bytes and the second area 220 and the fourth area 240 are set to 3580 bytes. That is, in the shared memory 131, the storage region allocated to the first processor 161 for data transmission (write zone) is the same size as the storage region allocated for data reception (read zone).

In step 301, the first processor 161 identifies data that is to be sent to the second processor 162. The first processor 161 may detect data being generated through the input unit 140 or the wireless communication unit 110, and determine necessity of transmission of the generated data to the second processor 162. In step 302, the first processor 161 determines the size of the data to be sent. The first processor 161 then determines the area of the shared memory 131 in which the data to be sent is to be written (transmit area), in step 303. More particularly, the first processor 161 may determine the transmit area by identifying the type of data to be sent. For example, when the data to be sent is formatted data, the transmit area may be the first area 210. When the data to be sent is raw data, the transmit area may be the second area 220.

In step 304, the first processor 161 compares the size of the data to be sent with the size of the transmit area, which serves to determine the possibility of data transmission on a single operation. If it is determined in step 304 that the size of the data to be sent is greater than the size of the transmit area, the first processor 161 performs a shared memory rearrangement in step 305. In other words, the first processor 161 determines that data transmission is not possible on a single operation. The shared memory rearrangement corresponds to enlargement of the transmit area in the shared memory 131, and is described in connection with FIG. 4.

In step 306, after the shared memory rearrangement, the first processor 161 writes the data to be sent in the enlarged transmit area. That is, the first processor 161 sends the data to the second processor 162 through the enlarged transmit area of the shared memory 131.

In contrast, if it is determined in step 304 that the size of the data to be sent is less than the size of the transmit area, the first processor 161 writes the data to be sent in the determined transmit area in step 307. That is, the first processor 161 sends the data to the second processor 162 through the initially determined transmit area of the shared memory 131.

After the shared memory rearrangement, the first processor 161 continues to send data to the second processor 162 through the rearranged shared memory 131. The state of the shared memory 131 is not changed until a request for a shared memory rearrangement is made by the first processor 161 or the second processor 162. After the shared memory rearrangement, the first processor 161 may reset the layout of the shared memory 131 to the initial state so that the write zone and the read zone are equal in size.

FIG. 3 depicts a case in which the first processor 161 sends data to the second processor 162. The system of FIG. 3 is also applicable to a case in which the second processor 162 sends data to the first processor 161.

Figure 4:
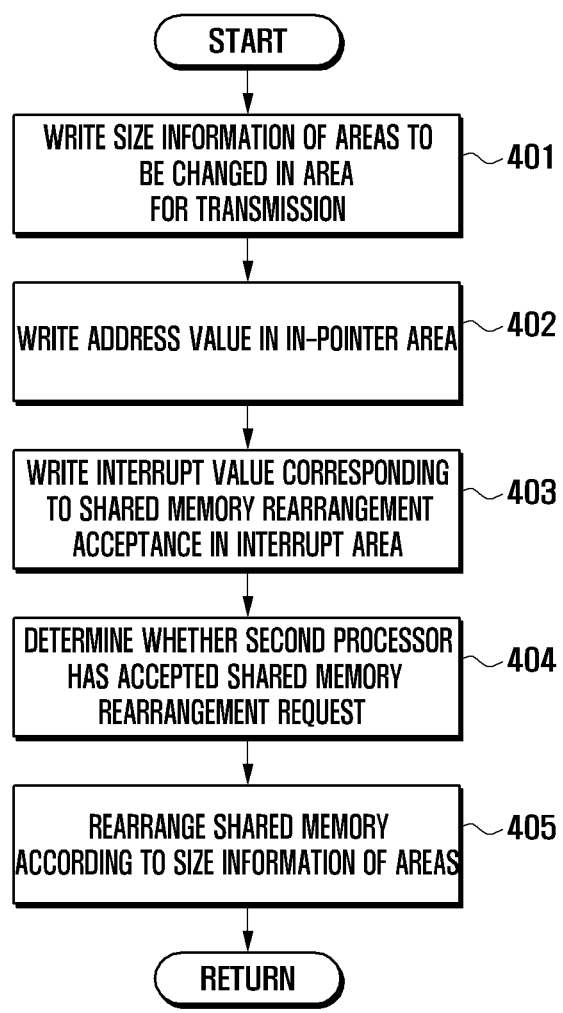
FIG. 4 is a flowchart illustrating a process for a shared memory rearrangement according to an exemplary embodiment of the present invention.

FIG. 4 is a flowchart illustrating a process for a shared memory rearrangement according to an exemplary embodiment of the present invention.

Referring to FIG. 4, the first processor 161 performs the shared memory rearrangement by writing size information of areas of the shared memory 131 to be changed in the transmit area in step 401. For example, referring to FIG. 2, to hold the size of the first area 210 at 512 bytes, and to change the sizes of the second area 220, the third area 230 and the fourth area 240 respectively to 6000 bytes, 836 bytes and 836 bytes, with the transmit area being the second area 220, the first processor 161 writes '512', '6000', '836' and '836' in the second buffer area 223 of the second area 220. Here, the first processor 161 may use 4 bytes of the second buffer area 223 for the size information.

In step 402, the first processor 161 writes the address value of the size information in the corresponding in-pointer area. For example, when the first processor 161 writes '512', '6000', '836' and '836' as size information in the second buffer area 223, it then writes the address value of the location storing the size information in the second in-pointer area 221. Here, when the size information is stored at a location of 4 bytes from the beginning of the second buffer area 223, the address value becomes '4' and the first processor 161 writes '4' in the second in-pointer area 221.

In step 403, the first processor 161 writes an interrupt value corresponding to a shared memory rearrangement acceptance in the first interrupt area 251. In an exemplary embodiment of the present invention, an interrupt value is set to indicate an operation that is to be carried out by the counterpart processor. When the first processor 161 writes an interrupt value in the first interrupt area 251, the second processor 162 is interrupted to perform an operation indicated by the interrupt value stored in the first interrupt area 251. For example, when the first processor 161 writes data in a transmit area (the first area 210 or second area 220) and writes an interrupt value corresponding to data reception in the first interrupt area 251, the second processor 162 is interrupted to read the interrupt value from the first interrupt area 251 and reads the data stored in the transmit area. In an exemplary implementation, interrupt values corresponding to a "shared memory rearrangement acceptance" and a "shared memory rearrangement response confirmation" are defined. The first processor 161 writes the interrupt value corresponding to the "shared memory rearrangement acceptance" in the first interrupt area 251, causing the second processor 162 to be interrupted.

Upon being interrupted, the second processor 162 reads the interrupt value from the first interrupt area 251 and is thus aware of a request for a shared memory rearrangement acceptance from the first processor 161. The second processor 162 reads the size information of the areas to be changed from the corresponding buffer area. For example, when the first processor 161 has written '512', '6000', '836' and '836' as size information (in bytes) in the second buffer area 223, the second processor 162 reads the size information from the second buffer area 223. Thereafter, the second processor 162 writes an interrupt value corresponding to the "shared memory rearrangement response confirmation" in the second interrupt area 252, causing the first processor 161 to be interrupted.

Upon being interrupted, the first processor 161 determines whether the second processor 162 has accepted the shared memory rearrangement request in step 404. In step 405, when the second processor 162 has accepted the shared memory rearrangement request, the first processor 161 performs shared memory rearrangement according to the size information of areas given at step 401. For example, when the first processor 161 has written '512', '6000', '836' and '836' as size information (in bytes) in the second buffer area 223, it performs a shared memory rearrangement so that the first area 210, the second area 220, the third area 230, and the fourth area 240 become 512 bytes, 6000 bytes, 836 bytes and 836 bytes, respectively. For a rearrangement of the shared memory 131, the first processor 161 may change the address value of the boundary between the first area 210 and the second area 220, the address value of the boundary between the second area 220 and the third area 230, and the address value of the boundary between the third area 230 and the fourth area 240.

FIGS. 5A to 5D illustrate a rearrangement of a shared memory performed by a first processor and a second processor according to an exemplary embodiment of the present invention.

Referring to FIGS. 5A to 5D, the first processor 161 writes size information of areas of the shared memory 131 to be changed in the transmit area (①). For example, the first processor 161 writes '512', '6000', '836' and '836' as size information (in bytes) in the second buffer area 223.

The first processor 161 writes the address value of the size information in the corresponding in-pointer area (②). For example, the first processor 161 writes '4', as the address value of the location storing the size information ('512', '6000', '836' and '836'), in the second in-pointer area 221.

The first processor 161 writes an interrupt value corresponding to a shared memory rearrangement acceptance in the first interrupt area 251 (③). For example, the first processor 161 writes '2', as an interrupt value corresponding to the shared memory rearrangement acceptance, in the first interrupt area 251. When the first processor 161 writes an interrupt value in the first interrupt area 251, the second processor 162 is interrupted.

Figure 5A:
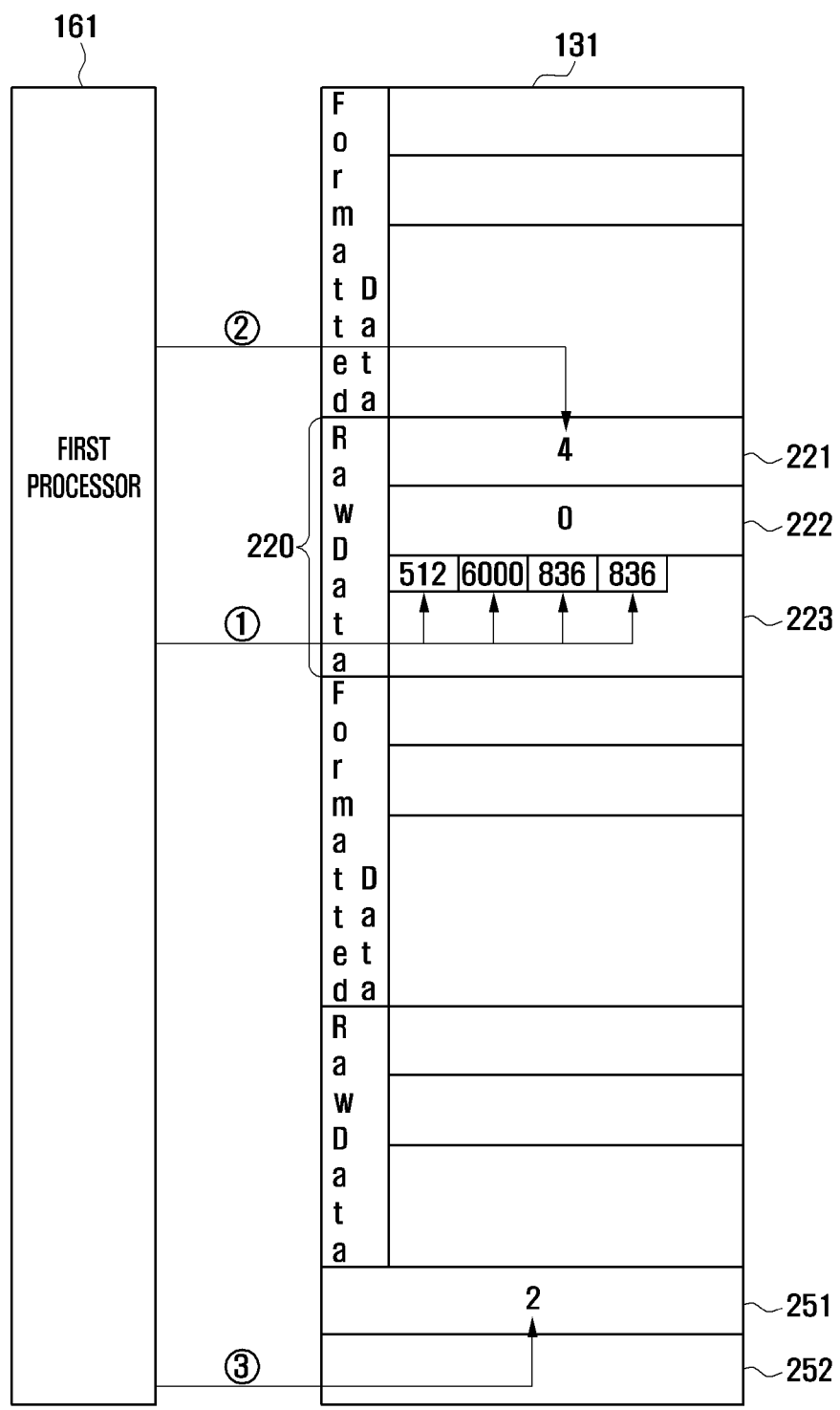
FIGS. 5A to 5D illustrate a rearrangement of a shared memory performed by a first processor and a second processor according to an exemplary embodiment of the present invention.
Figure 5B:
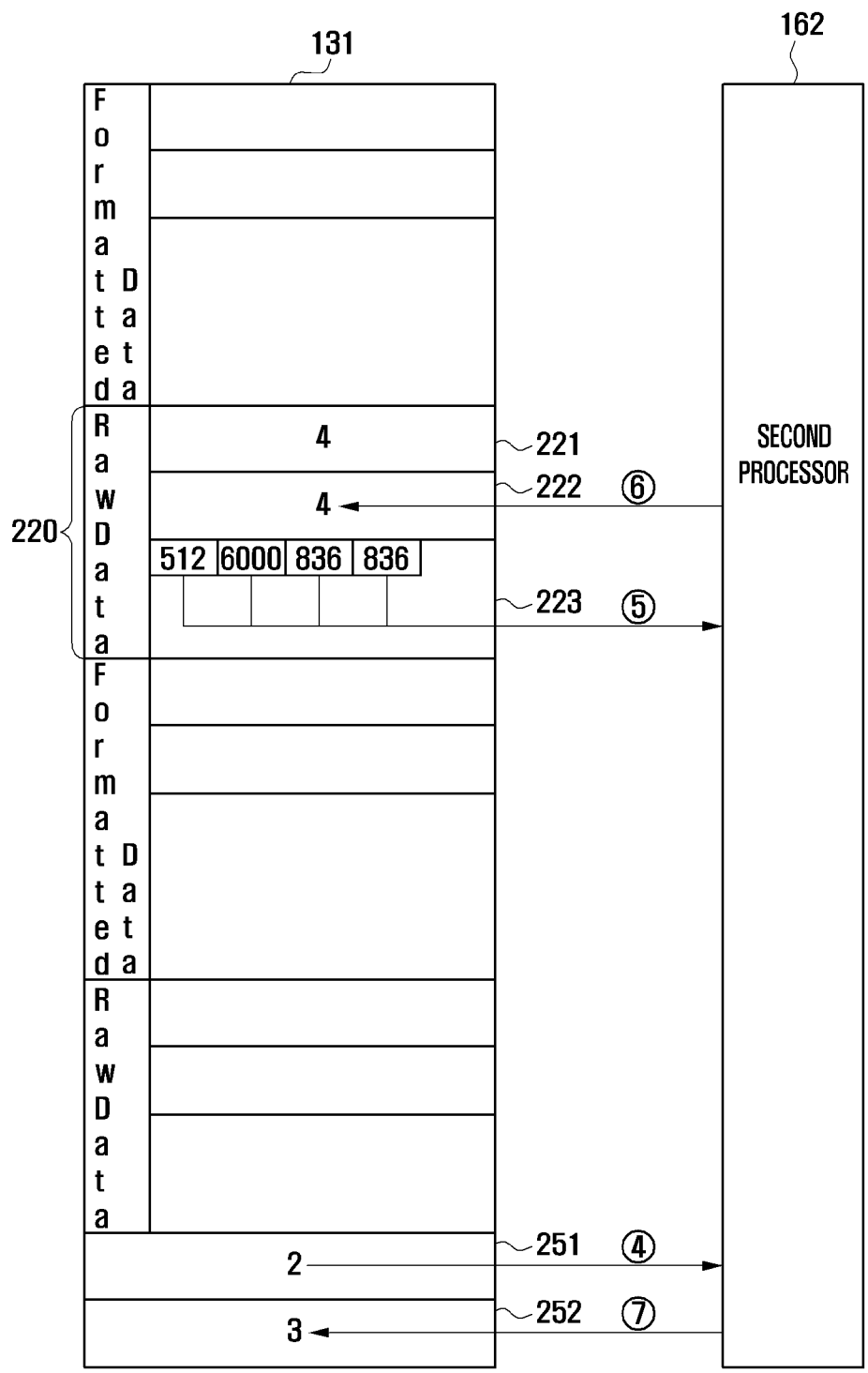

As in FIG. 5B, upon being interrupted, the second processor 162 reads the interrupt value from the first interrupt area 251 (④). For example, the second processor 162 accesses the first interrupt area 251 and obtains '2' as an interrupt value corresponding to the shared memory rearrangement acceptance. The second processor 162 reads the size information of the areas to be changed from the corresponding buffer area (⑤). For example, the second processor 162 reads '512', '6000', '836' and '836', as size information in bytes, from the second buffer area 223. The second processor 162 writes the number of read data items in the corresponding out-pointer area (⑥). For example, the second processor 162 writes '4', as the number of read data items, in the second out-pointer area 222.

The second processor 162 writes an interrupt value corresponding to the "shared memory rearrangement response confirmation" in the second interrupt area 252 (⑦). For example, the second processor 162 writes '3', as an interrupt value corresponding to the "shared memory rearrangement response confirmation", in the second interrupt area 252. When the second processor 162 writes an interrupt value in the second interrupt area 252, the first processor 161 is interrupted, upon which it determines whether the second processor 162 has accepted the shared memory rearrangement request.

Figure 5C:
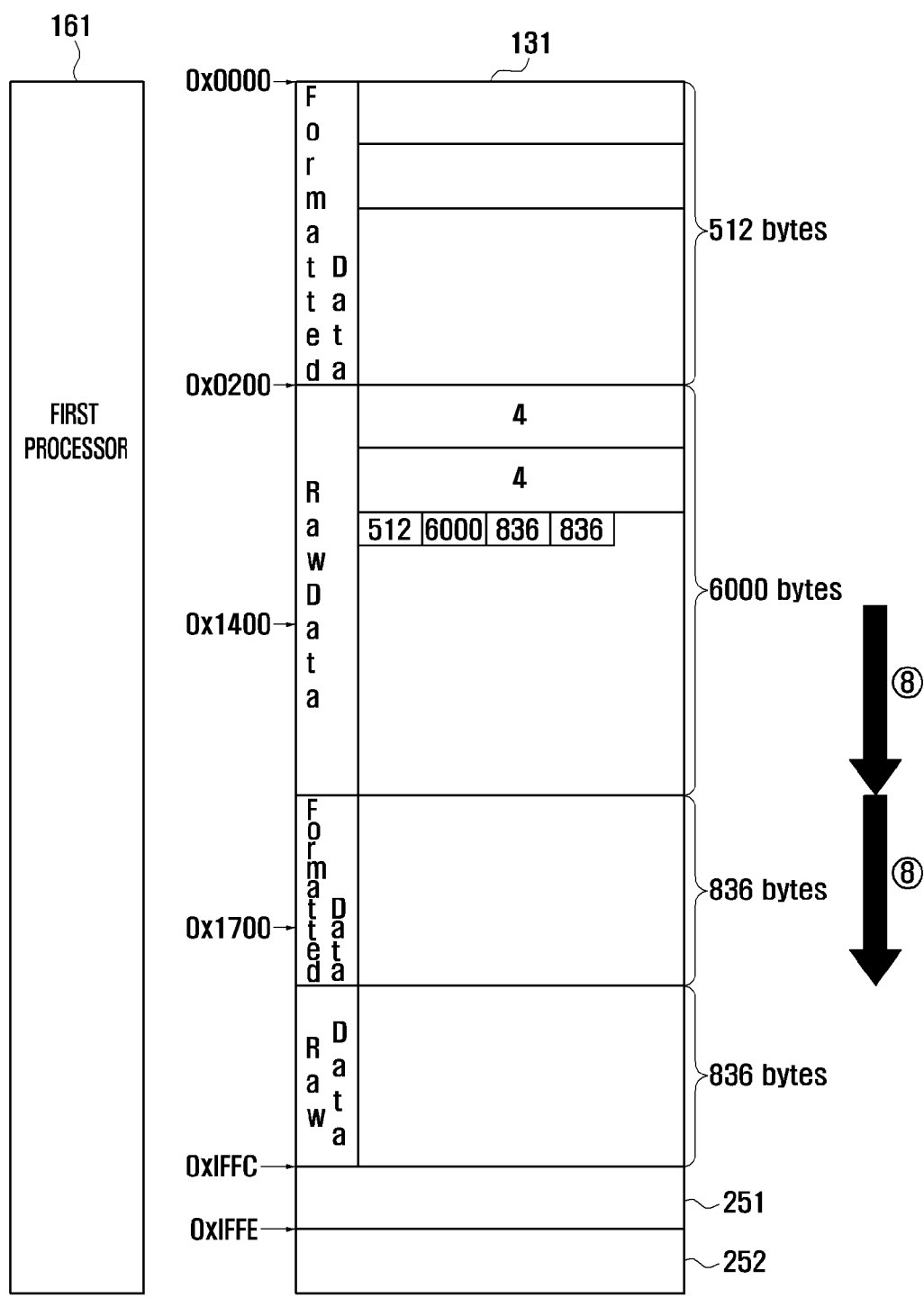

As in FIG. 5C, when the second processor 162 has accepted the shared memory rearrangement request, the first processor 161 performs a shared memory rearrangement according to the size information of areas (⑧). For example, the first processor 161 rearranges the shared memory 131 so that the first area 210, the second area 220, the third area 230 and the fourth area 240 become 512 bytes, 6000 bytes, 836 bytes and 836 bytes, respectively, in size.

Referring to FIG. 2 and FIG. 5C, the first processor 161 sustains the address value of the boundary between the first area 210 and the second area 220 ('0x0200'), changes the address value of the boundary between the second area 220 and the third area 230 from '0x1000' to '0x1400', and changes the address value of the boundary between the third area 230 and the fourth area 240 from '0x1200' to '0x1700'.

Thereafter, the first processor 161 sends data to the second processor 162 through the rearranged shared memory 131.

Figure 5D:
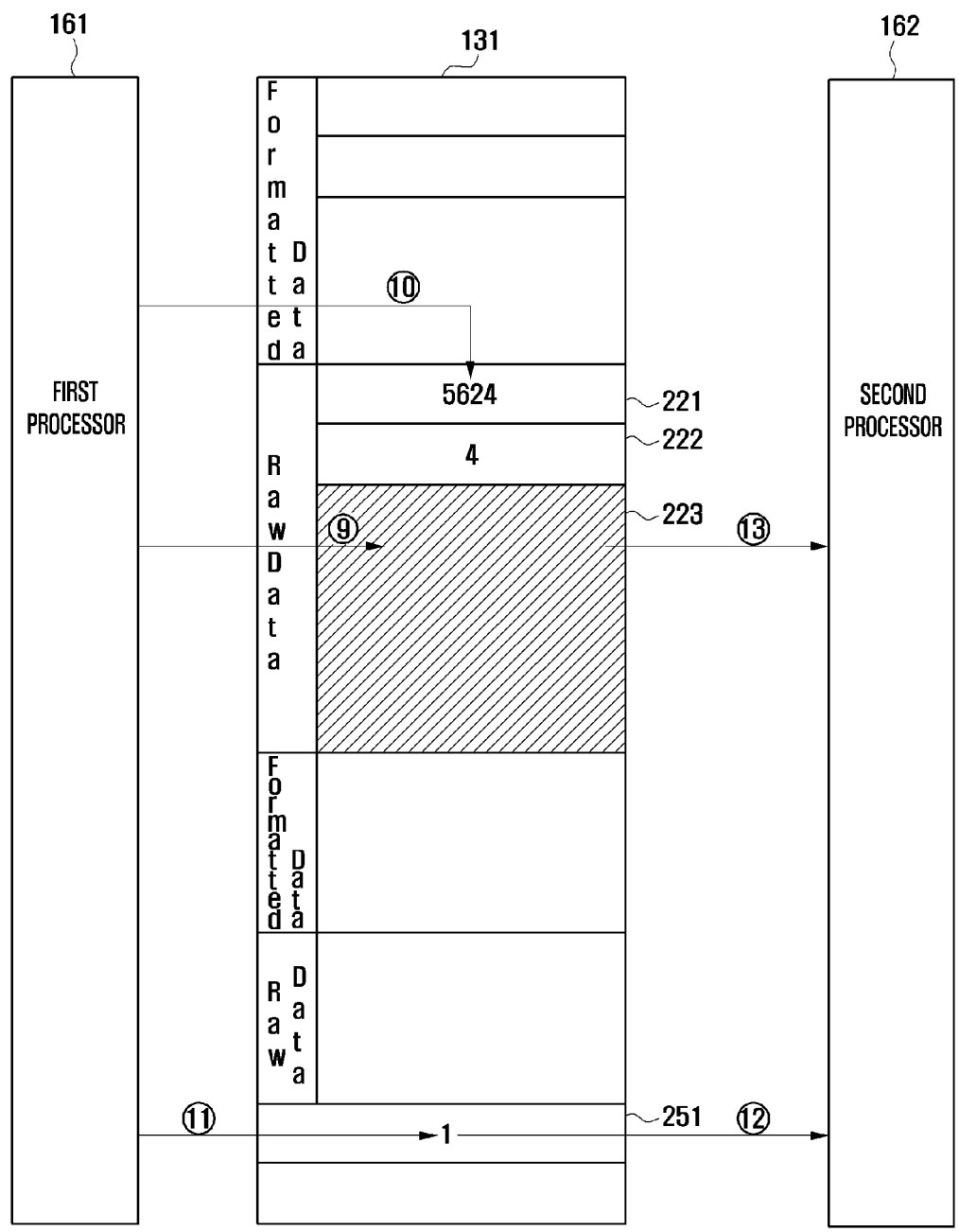

For example, as in FIG. 5D, to send raw data of 5624 bytes to the second processor 162, the first processor 161 writes the data to be sent in the second buffer area 223 (⑨), writes the address value of the data in the second in-pointer area 221 (⑩), and writes '1', as an interrupt value corresponding to "data reception", in the first interrupt area 251 (⑪). The second processor 162 reads '1' as an interrupt value from the first interrupt area 251 (⑫), and reads the data from the second buffer area 223 (⑬).

The above description is focused on the case in which the first processor 161 sends data to the second processor 162. However, the above system is also applicable to the case in which the second processor 162 sends data to the first processor 161.

In the above described method, the areas in the shared memory 131 can be dynamically changed in size, and each processor can read and write a large amount of data on a single operation. Hence, efficiency of inter-processor communication can be increased.

The method for inter-processor communication in exemplary embodiments of the present invention may be implemented as computer programs and may be stored in various computer readable storage media. The computer readable storage media may store program instructions, data files, data structures, and combinations thereof. The program instructions may include instructions developed specifically for the present invention and existing general-purpose instructions.

The computer readable storage media may include any or all of a magnetic media such as a hard disk and a floppy disk, an optical media such as a CD-ROM and a DVD, a magneto-optical media such as a floptical disk, memory devices such as a ROM and a RAM, and the like. The program instructions may include machine codes produced by compilers and high-level language codes executable through interpreters.

While the invention has been described with reference to certain exemplary embodiments thereof, it will be understood by those skilled in the art that various changes in form and details may be made therein without departing from the spirit and scope of the invention as defined in the appended claims and their equivalents.

What is claimed is:

1. A method of inter-processor communication for a mobile terminal having a first processor, a second processor and a shared memory, the method comprising:
   determining, by the first processor, the size of data to be sent to the second processor;
   comparing the determined size of the data to be sent to the second processor with the size of one of multiple buffer areas in the shared memory to be used for transmission;
   rearranging the shared memory according to the data size when the size of the data to be sent to the second processor is greater than the size of the buffer area to be used; and
   sending the data to the second processor through the rearranged shared memory,
   wherein the determining of the size of data to be sent further comprises determining whether the data to be sent is formatted data or raw data.

2. The method of claim 1, wherein the shared memory comprises a first buffer area configured to store formatted data to be sent from the first processor to the second processor, a second buffer area configured to store raw data to be sent from the first processor to the second processor, a third buffer area configured to store formatted data to be sent from the second processor to the first processor, and a fourth buffer area configured to store raw data to be sent from the second processor to the first processor.

3. The method of claim 1, wherein the comparing of the determined size of the data with the size of one of multiple buffer areas comprises comparing the size of the data to be sent with the size of the first buffer area when the data to be sent is formatted data, and comparing the size of the data to be sent with the size of the second buffer area when the data to be sent is raw data.

4. The method of claim 2, wherein the rearranging of the shared memory comprises changing the size of at least one of the first buffer area, the second buffer area, the third buffer area, and the fourth buffer area.

5. The method of claim 2, wherein the rearranging of the shared memory comprises changing at least one of the address value of the boundary between the first buffer area and the second buffer area, the address value of the boundary between the second buffer area and the third buffer area, and the address value of the boundary between the third buffer area and the fourth buffer area.

6. The method of claim 1, wherein the rearranging of the shared memory comprises:
   writing, by the first processor, new size information of the first buffer area, the second buffer area, the third buffer area, and the fourth buffer area in a buffer area for transmission;
   writing an interrupt value corresponding to a shared memory rearrangement acceptance in a first interrupt area of the shared memory;
   determining whether the second processor has accepted the shared memory rearrangement request; and
   changing the size of at least one of the first buffer area, the second buffer area, the third buffer area, and the fourth buffer area according to the new size information.

7. The method of claim 1, wherein the first processor and the second processor are comprised in a control unit of the mobile terminal.

8. The method of claim 1, wherein in the shared memory, the storage region allocated to the first processor for data transmission is the same size as the storage region allocated for data reception.

9. A mobile terminal comprising:
a shared memory including multiple buffer areas;
a first processor configured to determine the size of data to be sent and whether the data is formatted data or raw data, to compare the size of the data with the size of one of the buffer areas to be used for transmission, to rearrange the shared memory according to the data size when the size of the data is greater than the size of the buffer area to be used, and to send the data through the rearranged shared memory; and
a second processor configured to receive data from the first processor through the shared memory.

10. The mobile terminal of claim 9, wherein the shared memory comprises a first buffer area configured to store formatted data to be sent from the first processor to the second processor, a second buffer area configured to store raw data to be sent from the first processor to the second processor, a third buffer area configured to store formatted data to be sent from the second processor to the first processor, and a fourth buffer area configured to store raw data to be sent from the second processor to the first processor.

11. The mobile terminal of claim 10, wherein the first processor compares the size of the data to be sent with the size of the first buffer area when the data to be sent is formatted data, and compares the size of the data to be sent with the size of the second buffer area when the data to be sent is raw data.

12. The mobile terminal of claim 10, wherein the first processor, to rearrange the shared memory, writes new size information of the first buffer area, the second buffer area, the third buffer area, and the fourth buffer area in a buffer area for transmission, writes an interrupt value corresponding to a shared memory rearrangement acceptance in a first interrupt area of the shared memory, determines whether the second processor has accepted the shared memory rearrangement request, and changes the size of at least one of the first buffer area, the second buffer area, the third buffer area, and the fourth buffer area according to the new size information.

13. The mobile terminal of claim 12, wherein, when interrupted by the first processor, the second processor reads the size information of the first buffer area, the second buffer area, the third buffer area, and the fourth buffer area written by the first processor, and writes an interrupt value corresponding to the shared memory rearrangement response confirmation in a second interrupt area of the shared memory.

14. The mobile terminal of claim 13, wherein the first processor determines whether the second processor has accepted the shared memory rearrangement request by determining the interrupt value written in the second interrupt area.

* * * * *